United States Patent
Sato

(10) Patent No.: US 11,981,265 B2
(45) Date of Patent: May 14, 2024

(54) IN-VEHICLE DEVICE AND METHOD FOR CONTROLLING IN-VEHICLE DEVICE

(71) Applicant: Faurecia Clarion Electronics Co., Ltd., Saitama (JP)

(72) Inventor: Takuya Sato, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 199 days.

(21) Appl. No.: 17/747,435

(22) Filed: May 18, 2022

(65) Prior Publication Data
US 2022/0371527 A1   Nov. 24, 2022

(30) Foreign Application Priority Data
May 24, 2021   (JP) ................. 2021-087205

(51) Int. Cl.
*B60R 11/02*   (2006.01)
*B60R 11/00*   (2006.01)

(52) U.S. Cl.
CPC ..... *B60R 11/0217* (2013.01); *B60R 2011/004* (2013.01)

(58) Field of Classification Search
CPC .......... B60R 11/0217; B60R 2011/004; G01C 21/3697; H04R 3/005; H04R 2499/13; G10K 15/08
See application file for complete search history.

(56) References Cited

U.S. PATENT DOCUMENTS 10,970,899 B2 *   4/2021   Rakshit .................. B60K 35/28
2020/0126276 A1 *   4/2020   Rakshit .................... G01S 3/802

FOREIGN PATENT DOCUMENTS

JP   2006-096070 A   4/2006

* cited by examiner

*Primary Examiner* — Tuan D Nguyen
(74) *Attorney, Agent, or Firm* — Volpe Koenig

(57) ABSTRACT

To control appropriately whether or not outside sound will be outputted into the vehicle cabin. An in-vehicle device wherein a microphone for inputting sound from outside of the vehicle is connected so as to communicate with a speaker for outputting sound into the cabin of the vehicle identifies, from location control information that is information for expressing the location for each of one or more locations and including metadata for each location, a location that is included within a predetermined range from the current location of the vehicle, identified based on a GPS (Global Positioning System) signal. The onboard apparatus controls whether or not to output, through the speaker, the outside sound that is inputted through the microphone, based on whether or not the location metadata satisfies an outside sound outputting or outside sound non-outputting condition.

8 Claims, 4 Drawing Sheets

IN-VEHICLE DEVICE AND METHOD FOR CONTROLLING IN-VEHICLE DEVICE

FIELD OF INVENTION

The present invention relates, in general, to controlling the output of outside sounds into a cabin of a vehicle.

PRIOR ART

Accompanying improvements in sound blocking performance in vehicles (such as passenger vehicles), it has become difficult to hear outside sounds in the vehicle cabin. Outside sounds include, for example, the voices of children, the approach of runaway vehicles, and the like, which are sounds that relate to situations wherein caution is required in operation of the vehicle.

Given this, there is a known technology for outputting, into the vehicle cabin, outside sound collected by microphones that are provided on the vehicle. The technology disclosed in Patent Document 1, for example, is known as this type of technology. The technology disclosed in Patent Document 1 enables danger sounds, as outside sounds, to be heard optimally in the cabin, even when listening to music.

PRIOR ART REFERENCES

Patent Documents

Patent Citation 1—Japanese Unexamined Patent Application Publication 2006-096070

SUMMARY OF THE INVENTION

Problem Solved by the Present Invention

If outside sound were always outputted into the vehicle cabin, then when a danger sound is picked up, that danger sound would be outputted immediately into the vehicle cabin. However, a state wherein outside sounds are always outputted into the vehicle cabin would be equivalent to a state wherein there is no sound blocking capability in the vehicle.

On the other hand, if whether or not to output the outside sound into the cabin is controlled arbitrarily, the outside sound might not be outputted into the cabin despite being in a state wherein it would be desirable for the outside sound to be outputted into the cabin, or outside sound might be outputted into the cabin despite being in a state wherein it would be desirable for the outside sound to not be outputted into the cabin.

Means for Solving the Problem

An in-vehicle device, wherein a microphone for inputting sound from outside of the vehicle is connected so as to communicate with a speaker for outputting sound into the cabin of the vehicle, identifies, from location control information that is information for expressing the location for each of one or more locations and including metadata for each location, a location that is included within a predetermined range from the current location of the vehicle, identified based on a GPS (Global Positioning System) signal. The in-vehicle device controls whether or not to output, through the speaker, the outside sound that is inputted through the microphone, based on whether or not the location metadata satisfies an outside sound outputting or outside sound non-outputting condition.

Effects of the Invention

Whether or not to output outside sound into a vehicle cabin is controlled appropriately through the present invention.

BRIEF DESCRIPTIONS OF THE DRAWING

FORMS FOR PERFORMING THE PRESENT INVENTION

In the explanation below, the "interface device" may be one or more interface devices (typically a communication interface device).

Moreover, in the explanation below, the "memory" may be one or more memories, and may be a volatile memory device or a non-volatile memory device.

Additionally, in the explanation below the "permanent storage device" may be one or more nonvolatile storage devices (for example, an HDD (Hard Disk Drive), SSD (Solid State Drive), or the like).

Moreover, in the explanation below the "storage device" may be a memory that is a memory and/or a permanent storage device.

Additionally, in the explanation below the "control device" may include one or more processing devices. Typically, at least one processing device may be a microprocessor such as a CPU (Central Processing Unit), but may instead be another type of processing device, such as a GPU (Graphics Processing Unit). Moreover, the control device may include a hardware circuit for performing some or all of the processing (for example, an FPGA (Field-Programmable Gate Array), a CPLD (Complex Programmable Logic Device), or an ASIC (Application Specific Integrated Circuit)).

Moreover, in the explanation below, functions may be explained using an expression such as the "yyy unit," but the function may be achieved through execution of one or more computer programs on a processor, may be achieved through one or more hardware circuits (such as FPGAs or ASICs), or may be achieved through a combination thereof. A process explained with a function subject may be a process that is carried out by a device that includes the processor. A plurality of functions may be combined into a single function, or a single function may be divided into a plurality of functions.

Note that, in the explanation below, in cases of explanations wherein there is no discrimination between similar elements, the shared part of reference symbols may be used, and in explanations wherein identical elements are to be distinguished from each other, reference symbols may be used. For example, and in explanations wherein there is no particular discrimination made between speakers, the description might be of a "speaker 103," where if the explanation discriminates between individual speakers, the description might be of a "speaker 103FR" and "speaker 103RR."

Figure 1:
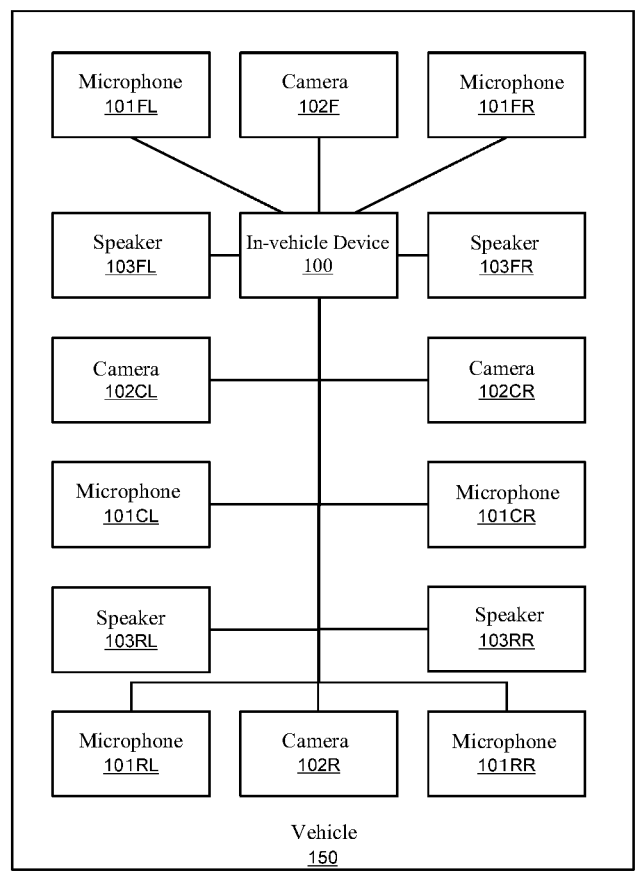
FIG. 1 shows a structural example of an entire system relating to one embodiment according to the present invention.

FIG. 1 shows an example of the overall structure of a system according to one embodiment according to the present invention.

A plurality of microphones 101 (or a single microphone 101), a plurality of cameras 102 (or a single camera 102), and a plurality of speakers 103 (or a single speaker 103) are equipped on a vehicle 150, and an in-vehicle device 100 that is connected (through, for example, being physically wired or connected wirelessly) so as to enable communication with these microphones 101, cameras 102, and speakers 103 is provided.

Each individual microphone 101 of the plurality thereof is equipped so as to enable inputting of sound from the outside of the vehicle 150. The plurality of microphones 101 may be, for example, a front-left microphone 101FL, a front-right microphone 101FR, a center-left microphone 101CL, a center-right microphone 101CR, a rear-left microphone 101RL, and a rear-right microphone 101RR. These microphones 101 pick up outside sounds and output analog signals as outside sound signals. The analog signal outputted by each microphone 101 is inputted into the in-vehicle device 100 as a digital signal through an A/D converter (not shown). The in-vehicle device 100 outputs a digital signal based on these digital signals. The outputted digital signal is outputted as an analog signal through a D/A converter (not shown), and outputted, as an outside sound, from at least one speaker 103. The A/D converter and the D/A converter, referenced above, may be provided either internally in the in-vehicle device 100 or external thereto.

Each of the plurality of cameras 102 is provided for imaging the interior of the vehicle cabin or the outside of the vehicle. The plurality of cameras 102 may be, for example, a forward camera 102F, a center-left camera 102CL, a center-right camera 102CR, and a rearward camera 102R. The images (videos or still images) captured by these cameras 102 are inputted into the in-vehicle device 100. The in-vehicle device 100 analyzes images that are inputted and, based on the result of the analysis, selects whether or not to output the outside sound and/or selects a speaker 103 for outputting the outside sound.

Each individual speaker of the plurality of speakers 103 is provided so as to output sound into the cabin of the vehicle 150. The plurality of speakers 103 may be, for example, a front-left speaker 103FL, a front-right speaker 103FR, a rear-left speaker 103RL, and a rear-right speaker 103RR. These speakers 103 output sound according to an analog signal that is outputted from the in-vehicle device 100.

Figure 2:
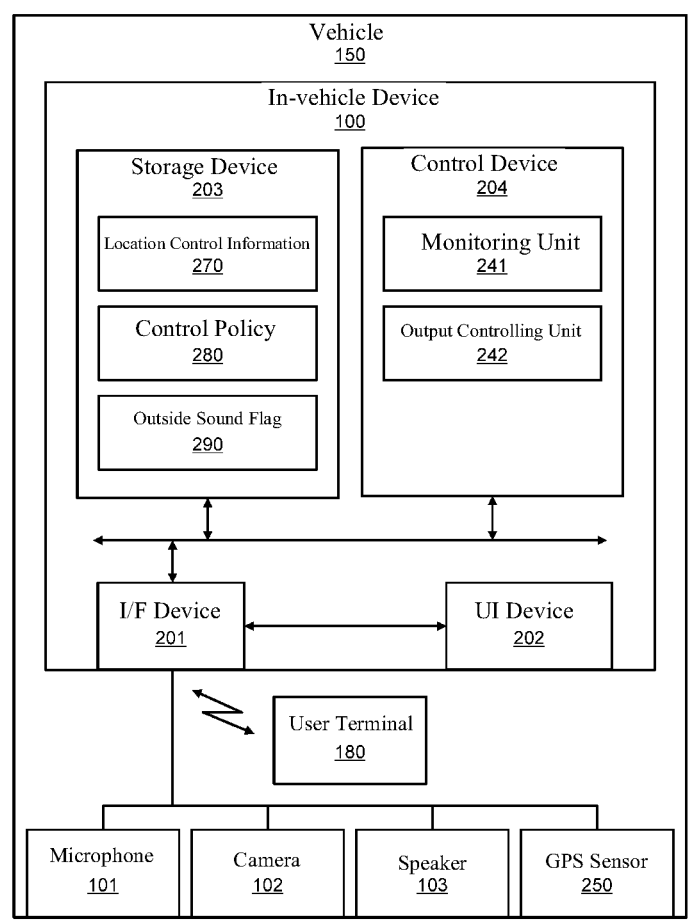
FIG. 2 shows an example of the functional structure of the in-vehicle device.

FIG. 2 shows an example of a functional structure for the in-vehicle device 100.

The in-vehicle device 100 comprises an I/F device (interface device) 201, a UI (User Interface) device 202, a storage device 203, and a control device 204.

The microphones 101, cameras 102, speakers 103, UI device 202, a GPS (Global Positioning System) sensor 250, and a user terminal 180 are connected (for example, physically wired or connected wirelessly) to the I/F device 201. The device may or may not be able to communicate through a wide area network, such as the Internet or a WAN (Wide Area Network) through the I/F device 201. In the latter case, the I/F device 201 may be able to communicate with a device that is able to communicate through a wide area network, such as the user terminal 180.

The GPS sensor 250 may be provided either internally in the in-vehicle device 100 or external thereto. The GPS sensor 250, based on GPS signals, identifies the current location of the vehicle 150 that is equipped with the GPS sensor 250. Information indicating the current location that has been identified is inputted into the in-vehicle device 100 through the I/F device 201 and stored in the storage device 203.

The user terminal 180 is an information processing terminal of the user within the cabin of the vehicle 150, and may be, for example, a smart phone (or a tablet-type or laptop-type computer).

The user terminal 180 may have an applicable application that is an application for identifying, for each of one or a plurality of evaluations relating to information that expresses respective locations, information indicating the evaluation and information indicating a location in relation to the evaluation. The applicable application may be, for example, a map application or an SNS (Social Networking Service) application. The information for expressing an evaluation may be information expressing an evaluation for a location linked to the evaluation (for example, in particular, an evaluation regarding an external sound at that location). Note that, for example, the user terminal 180 may be omitted.

The UI device 202 is an input/output device, and may be a touch panel-type display device, for example. The UI device 202 may include a warning light. Additionally, the UI device 202 may include a button, such as a power supply button, or the like. Moreover, the UI device 202 may include a microphone for inputting voice and/or a speaker for outputting sound. The speaker of the UI device 202 may be some or all of the speakers for outputting the outside sound.

Information for location control information 270, control policies 280, and an outside sound flag 290 is stored in the storage device 203. The control device 204 achieves the functions of a monitoring unit 241 and an output controlling unit 242 through execution of a computer program, for example.

The location control information 270 is information including information indicating each location, and metadata for each location, for each of the one or plurality of locations. For each location, the metadata of the location may include at least one of (A) through (C), below:

(A) Information expressing the topography, an intersection, a road, a facility, and the type and state of the surface at the location (and may include information expressing, for example, a home location, information expressing a high-crime location, information expressing a road sign, or the like).

(B) Information expressing the importance of the location; and/or (C) Information that is related to the location, expressing an evaluation regarding outside sound at that location.

The information for (A) may include, for example, map information that expresses a map (for example, information that includes road network information with intersections as nodes and roads as links between the intersections), and may be information that is inputted manually or may be POI (Point of Interest) information that is inputted in accordance with an WI (In-Vehicle Infotainment) technology.

Moreover, the information of (B) may be, for example, information that is inputted manually, may be POI (Point of Interest) information that is inputted in accordance with an IVI (In-Vehicle Infotainment) technology, or may be emergency notification information (for example, information for an emergency earthquake warning, a tsunami warning, a volcanic eruption warning, or the like). Inclusion of such information in metadata can promote real-time situational awareness of rapid changes at the location by providing, into the vehicle cabin, the sounds of an earthquake or a tsunami, voice instruction from public safety officials, voices of individuals who are evacuating, or the like, if designated as an output condition for the outside sound.

Moreover, the information of (C) may be, for example, information that is inputted manually or information (for example, POI information) inputted in accordance with an IVI technology, and, in the present embodiment, is information received through an applicable application of the user terminal 180. The information of (C) may include, for example, information such as a text or a score (for example, the number of times that a "like" button, meaning praise for a comment, has been pressed in an SNS application) that expresses an evaluation regarding an outside sound. The information of (C) may be information that includes text that expresses positive language regarding the sound, such as "the rushing of the river is awesome" or "the singing of the birds is pretty." The inclusion of such information in the metadata enables the sound to be brought automatically into the vehicle cabin (or enables a notification through audio or a display device that an outside flag has been turned "ON") if designated as an output condition for the outside sound.

The inclusion of, for example, one or more of (A) through (C) in the metadata for each location makes it possible to control appropriately, depending on the current location of the vehicle 150, whether or not to output the outside sound into the cabin of the vehicle 150.

Moreover, information received, as information for (C) from an applicable application of the user terminal 180 (information that includes information expressing the location and information expressing an evaluation regarding the outside sound at the location) may include information expressing the most recent status of the location. The use of such information in a determination as to whether or not to output the outside sound, as described below, is anticipated to enable better control of whether or not to output the outside sound into the cabin of the vehicle 150 depending on the current location of the vehicle 150. Moreover, because information received from the user terminal 180 within the vehicle cabin can be used as the metadata (the location metadata) that is included in the location control information 270, it is anticipated that up-to-date metadata can be acquired for a location, even when the in-vehicle device 100 is a device that is unable to communicate through a wide area network such as the Internet.

A control policy 280 is information expressing a policy for controlling outputting of the outside sound (for example, a policy that includes conditions for outputting the outside sound). The outside sound flag 290 is a flag indicating whether or not to output the outside sound into the vehicle cabin.

The control device 204 is connected so as to enable communication with the I/F device 201 and the storage device 203. The control device 204 identifies locations included within a predetermined range from the current location identified by the GPS sensor 250 (the current location of the vehicle 150), doing so from among one or a plurality of locations expressed by the location control information 270. The control device 204 controls whether or not to output, through one or more speakers 103 of the (one or) plurality of speakers 103, an outside sound inputted through one or more of the microphones 101 of the (one or) plurality of microphones 101, based on whether or not the metadata for the location satisfies an outside sound outputting condition or outside sound non-outputting condition (for example, a condition defined as at least a portion of the control policies 280). Specifically, for example, the monitoring unit 241 monitors the control policies 280 and metadata for the locations within a predetermined range from the current location of the vehicle 150, to update the value ("ON" or "OFF") of the outside sound flag 290. "ON" means to output outside sound. "OFF" means to not output outside sound. The monitoring unit 241 may analyze an image captured by a camera 102 to determine the status of the surroundings of the vehicle 150, and update the value of the outside sound flag 290 based on whether or not an outside sound outputting condition or outside sound non-outputting condition is satisfied by the identified vicinity state, in addition to the metadata for the location. The "vicinity state" referred to here may be a state to the front, to the left side, to the right side, and/or to the rear of the vehicle 150. The output controlling unit 242 controls whether or not to output the outside sound through the speaker 103 depending on the value of the outside sound flag 290.

Figure 3:
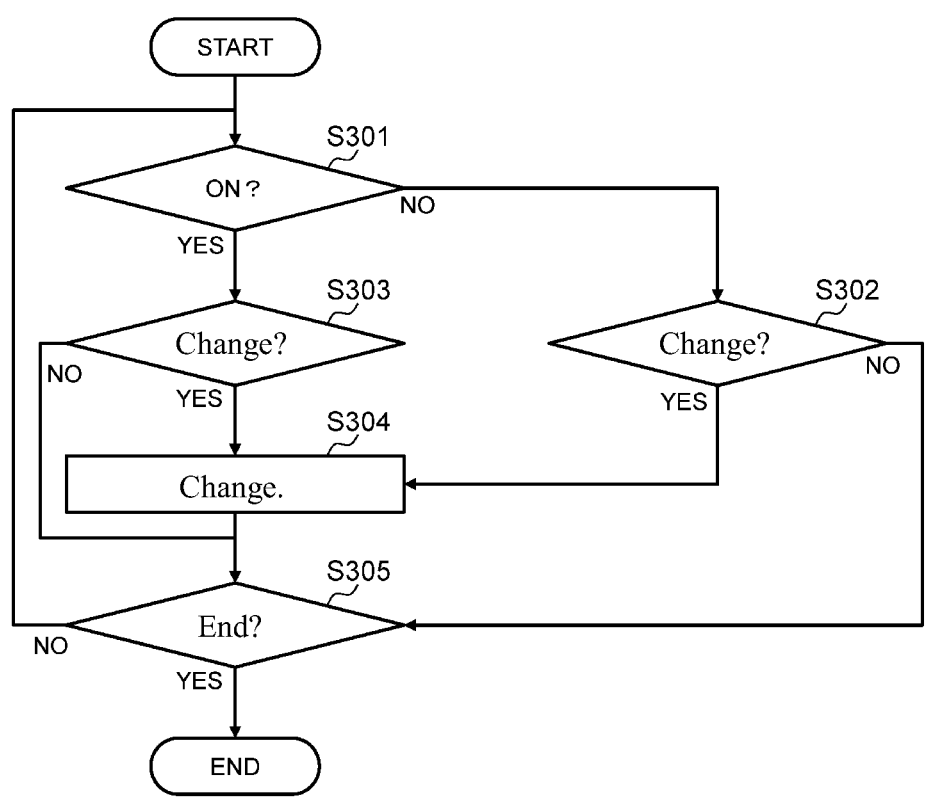
FIG. 3 shows an example of the process flow in the monitoring unit.

FIG. 3 shows an example of a process flow of the monitoring unit 241.

The monitoring unit 241 determinates whether or not the outside sound flag 290 is "ON" (S301).

If the determination result of the S301 is FALSE (S301: NO), the monitoring unit 241 determinates whether or not an event has occurred that will change the current outside sound flag 290 (S302). The event may be, for example, one of those described below:

(a1) A manual change operation through the UI device 202 (an outside sound flag change operation), or (a2) Metadata information for a given location that is a location within the predetermined range from the current location of the vehicle 150 is identified from the location control information 270, a determination as to whether or not the specified metadata satisfies an outside sound outputting condition (a condition expressed in the control policy 280) is performed, and the result of the determination is TRUE.

The "given location" may be a location that includes the current location, may be a location that is a predetermined distance ahead along the route for the vehicle 150 from the current location (for example, a route determined by the control device 204 based on map information) (or may be each of one or more locations up to the predetermined distance ahead), or may be a location at a predetermined distance to the rear along the route of the vehicle 150 from the current location (for example, a route determined by the control device 204 based on map information) (or may be each of one or more locations up to the predetermined distance to the rear). Moreover, the "current location" may be a location expressed in latitude and longitude, where the "given location" may be a location expressed in latitude and longitude, or may be a range (a geographic region) expressed through another method, instead of, or in addition to, latitude and longitude.

An example of satisfying an "outside sound outputting condition" may be, for example, the metadata information of the given location (and the vicinity state identified based on an analysis of the images captured by the cameras 102) satisfying one or more of the following:

The given location is a location that includes a building of a type wherein many children are present, such as a kindergarten, a nursery school, or an elementary school.

The given location is an intersection defined as an intersection with poor visibility.

The given location is included in an area that is defined as one wherein the sounds of nature can be enjoyed, such as an area wherein birds and insects live, or an area wherein there are many trees and plants.

If the determination result in S302 is TRUE (S302: YES), the monitoring unit 241 changes the value of the outside sound flag 290 from "OFF" to "ON" (S304). If monitoring has been completed (for example, if the power supply of the in-vehicle device 100 has been turned OFF) (S305: YES), the process is terminated.

If monitoring continues (S305: NO), processing returns to S301.

If the determination result in S302 is FALSE (S302: NO), processing advances to S305.

If the determination result of the S301 is TRUE (S301: YES), the monitoring unit 241 determinates whether or not an event has occurred that will change the current outside sound flag 290 (S303). The event may be, for example, one of those described below:

(b1) A manual change operation through the UI device 202 (an outside sound flag change operation), or (b2) Metadata information for a given location that is a location within the predetermined range from the current location of the vehicle 150 is identified from the location control information 270, a determination as to whether or not the specified metadata satisfies an outside sound non-outputting condition (a condition expressed in the control policy 280) is performed, and the result of the determination is TRUE.

An example of satisfying an "outside sound non-outputting condition" may be, for example, the metadata information of the given location (and the vicinity state identified based on an analysis of the images captured by the cameras 102) satisfying one or more of the following. It can be anticipated that privacy will be considered and the flow of loud noises into the cabin will be prevented thereby.

The given location is within a location defined as having an emphasis on privacy.

The given location is included in a location evaluated as having loud noises.

If the determination result in S303 is TRUE (S303: YES), the monitoring unit 241 changes the value of the outside sound flag 290 from "ON" to "OFF" (S304). Processing then advances to S305. On the other hand, if the determination result in S303 is FALSE (S303: NO), processing advances to S305.

Note that, given the flow shown in FIG. 3, the value of the outside sound flag 290 is changed automatically; however, instead of this, if S302 or S303 is YES, the monitoring unit 241 may display, through a display device, information indicating that the value of the outside sound flag 290 is to change (that is, that bringing outside sound into the cabin is to be ON or OFF), and S304 may be executed when there has been an operation for changing the value of the outside sound flag 290 in response to the display. That is, the outside sound flag 290 may be changed manually.

Figure 4:
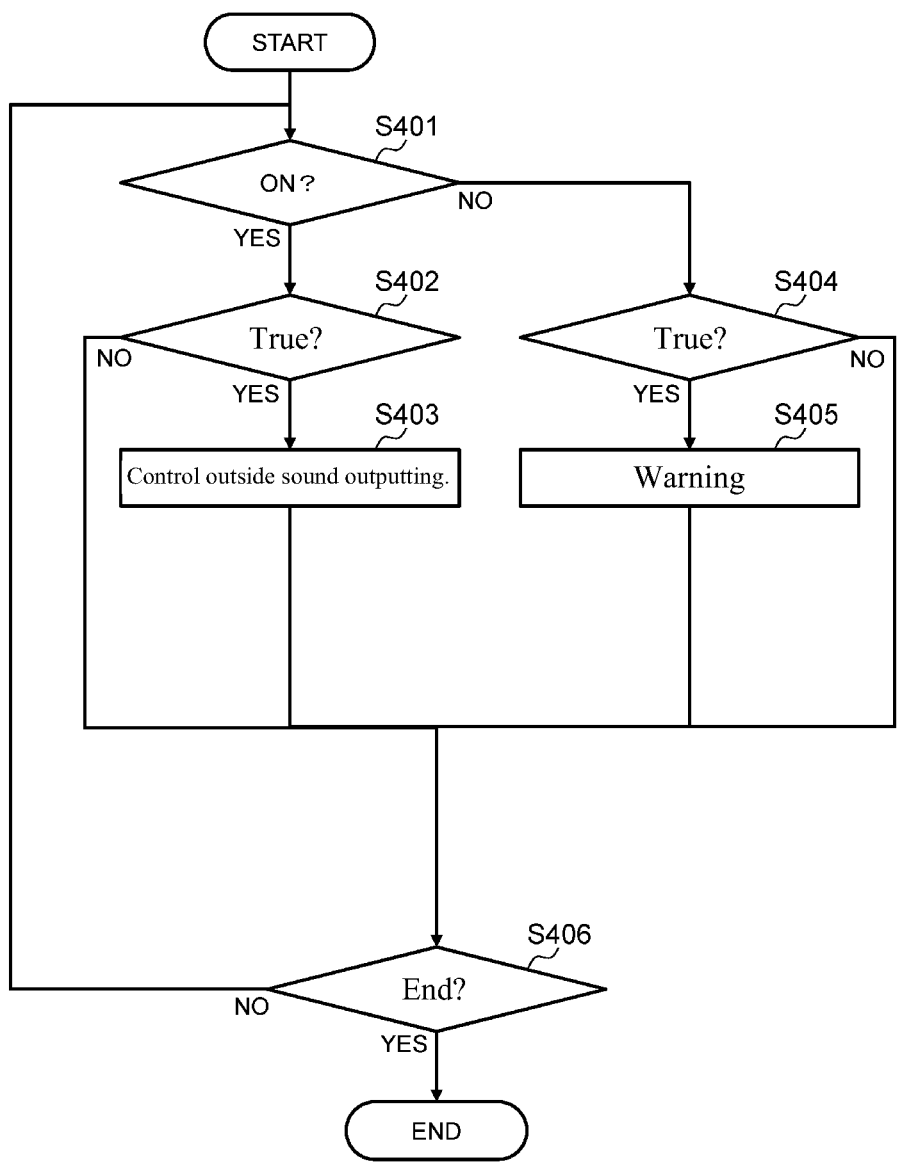
FIG. 4 shows an example of the process flow in the output controlling unit.

FIG. 4 shows an example of a process flow of the output controlling unit 242.

The output controlling unit 242 determinates whether or not the outside sound flag 290 is "ON" (S401).

If the determination result in S401 is TRUE (S401: YES), the output controlling unit 242 carries out outside sound output control (S403) so as to output the outside sound from the speaker 103 if outside sound has been inputted from a microphone 101 (S402: YES). If control has been completed (for example, if the power supply of the in-vehicle device 100 has been turned OFF) (S406: YES), the process is terminated. If the control is to continue (S406: NO), processing returns to S401.

If the determination result in S401 is FALSE (S401: NO), the output controlling unit 242 inputs outside sound from a microphone 101, and if the outside sound satisfies a predetermined condition (S404: YES), the output controlling unit 242 outputs a warning through a display device and/or a warning light of the UI device 202 (S405). Processing then advances to S406. Note that the "predetermined condition" in this paragraph may be a condition for a sound (which may be a voice) that can be considered to be a risk factor. Through this, even if the outside sound flag 290 is OFF, if a sound that can be considered to be a risk factor is inputted from the microphone 101, the user within the vehicle cabin can be notified (warned) that such a sound has been detected. Additionally, the display device may display information indicating the direction of the source that produced the sound, from the location of the microphone that inputted the sound most strongly (that is, may display the direction of the microphone).

In the present embodiment, the monitoring unit 241 identifies the given location as a location within a predetermined range from the current location of the vehicle, identified based on the GPS signal. The monitoring unit 241 updates the value of the outside sound flag 290 based on whether or not the metadata for the given location matches an outside sound outputting condition or outside sound non-outputting condition. The output controlling unit 242 controls, based on the value of the outside sound flag 290, whether or not to output, through the speakers 103, the outside sound that is inputted from the microphones 101. This makes it possible to control appropriately whether or not the outside sound will be outputted into the vehicle cabin. For example, if the outside sound outputting condition is that the metadata for the given location indicates a beach, a mountain road, or a city, it is possible to bring, into the cabin, the outside sound that is the sound of the waves, the songs of the birds, or the sound of the urban crowds, even in a case wherein it would be difficult to open the windows, due to pollen or motion sickness, or the like (in other words, even in a passenger compartment wherein the windows are closed). Moreover, if the given location is a location that is a predetermined distance ahead along a vehicle route from the current location of the vehicle (for example, a travel route determined by a navigation function, for example), at the start the outside sound will be brought into the cabin to begin with, and external sound can be anticipated to be preventative sound for identifying potential risk factors in advance.

Note that in the present embodiment, in S403 of FIG. 4, for example, one or more of (X) through (Z), below, may be carried out. Fade-in can be anticipated to protect the user (the passenger) from being startled by the input of a sudden outside sound, and fade-out can be anticipated to inform the user that the vehicle has left the location where it had been necessary to bring in the outside sound.

(X) If the metadata for a given location matches a predetermined condition for outputting outside sound (for example, a condition that means that the importance is high), and the vehicle 150 is near the given location, the monitoring unit 241 may set the outside sound flag 290 to "ON," and may set execution of a fade-in. If the output controlling unit 242 detects that the outside sound flag 290 is "ON" and that fade-in execution has been set, the output controlling unit 242 may start fading-in the outside sound from the speakers 103. (Y) If the metadata for a given location matches a predetermined condition for non-outputting of outside sound, and the vehicle 150 is near the given location, the monitoring unit 241 may set the outside sound flag 290 to "OFF," and may set execution of a fade-out. If the output controlling unit 242 detects that the outside sound flag 290 is "OFF" and that fade-out execution has been set, the output controlling unit 242 may start fading-out the outside sound from the speakers 103.

(Z) If the metadata for a given location matches the predetermined condition for outputting outside sound, and the vehicle 150 is far from the given location, the monitoring unit 241 may set the outside sound flag 290 to "ON," and may set execution of a fade-out. If the output controlling unit 242 detects that the outside sound flag 290 is "ON" and that fade-out execution has been set, the output controlling unit 242 may start fading-out the outside sound from the speakers 103.

For (X) or (Y), above, the output controlling unit 242 may perform outputting of outside sound through the speaker 103FL and/or speaker 103FR, and for (Z) may cause the outside sound to be outputted through the speaker 103RL and/or 103FR. This enables the user to be notified more accurately regarding nearing or leaving from the given location.

Additionally, the output controlling unit 242 may select a sound outputting mode, from among a plurality of sound outputting modes, to output the sound from the speakers 103 according to the selected sound outputting mode. Additionally, the control policy 280 may include information indicating the relationship between the sound outputting mode and metadata of a location. Specifically, if the outside sound flag 290 is "ON" and, of the plurality of sound outputting modes, a sound outputting mode is linked to the metadata for a given location, the output controlling unit 242 may use the linked sound outputting mode to output, through the speakers 103, the outside sound that has been inputted through the microphone 101 in S403 in FIG. 4, for example. This makes it possible to output more appropriately, into the vehicle cabin, the outside sound that is outputted, depending on the location. Note that the plurality of sound outputting modes may include a sound outputting mode for sound image localization and a sound outputting mode for sound field reproduction. Specifically, for example, they are as follows:

The sound outputting mode for sound image localization may be associated with locations defined as, for example, appropriate for danger avoidance (for example, a preschool, an intersection with poor visibility, a home parking space, or the like). In this sound outputting mode, the output controlling unit 242 may focus mainly on sound image localization in the two dimensions of front/back and left/right, and as necessary, emphasize sound that is determinated as a danger (emphasizing by, for example, volume, sound quality, or the like).

The sound outputting mode for sound field reproduction is associated with locations defined as needing to have primarily entertainment value, in relation to simulated reproduction of the environment outside of the vehicle.

With the sound outputting mode, the output controlling unit 242 uses a simulated 360° sound field generating algorithm that uses, for example, HRTF (Head-Related Transfer Function), or the like (further using sound effects such as reverb as well), to perform sound field reproduction with an emphasis on breadth of sound.

Additionally, as described above, the given location being a location that is defined as emphasizing privacy may be employed as a condition for non-outputting of outside sound. For example, a residential street may be used for such a location, where, in residential streets, the outside sound flag 290 may be set to "OFF" by default. For example, in a location that emphasizes privacy, such as a residential street, in a case wherein one desires to output the outside sound into the vehicle cabin (for example, when the monitoring unit 241 analyzes the outside sound that is inputted through the microphone 101 and identifies a risk factor as the result of the analysis), a dialogue such as "Please be careful of privacy" may be displayed by the monitoring unit 241 on a screen of the display device of the in-vehicle device 100, after which the monitoring unit 241 may change the outside sound flag 290 to "ON." Moreover, if the metadata for the given location includes POI information received by the in-vehicle device 100 from an applicable application, or POI information acquired through a wide information network, and the POI information includes information indicating a privacy protection area, the monitoring unit 241 may turn the outside sound flag 290 OFF automatically.

Additionally, the monitoring unit 241 may change the value of the outside sound flag 290 based on POI information or weather information that is inputted as other information into the in-vehicle device 100 (for example, information indicating hourly whether information or information in other areas, or information indicating weather specified by the monitoring unit 241 based on information inputted from the microphones 101 and/or the cameras 102), in addition to the metadata for the given location. For example, the monitoring unit 241 may turn the outside sound flag 290 ON automatically if, for the given location, the weather has a relatively high degree of danger for lightning and hail storms. This can be anticipated to prompt the user to evacuate through, for example, hearing, in the vehicle cabin, the thunderstorm and understanding the intensity and the delay between the thunder and the lightning. Moreover, if the weather is a hailstorm, the outside sound of the hail striking the ground or the vehicle body can be heard in the vehicle cabin, which can be anticipated to prompt the user to evacuate. Moreover, if the weather is rainfall, the outside sound from the rainfall can be heard in the vehicle cabin as an environmental sound that is more like entertainment, enabling the user to enjoy the sound of the rain.

While one embodiment was described above, this is an example for explaining the present invention, and the intent is not to limit the scope of the present invention to only this embodiment. The present invention may be carried out in a variety of other forms.

EXPLANATION OF REFERENCE SYMBOLS

100: In-vehicle device

The invention claimed is:
1. An in-vehicle device comprising:
an interface device connected so as to communicate with a microphone for inputting a sound from outside of a vehicle, a speaker for outputting sound into the cabin of the vehicle, and a GPS sensor for identifying the current location of the vehicle based on a GPS (Global Positioning System) signal;
a storage device for storing location information which is information that includes information expressing the location, for one or each of a plurality of locations, and metadata for each location; and
a control device, connected so as to communicate with the interface device and the storage device, for identifying, from among the one or plurality of locations, a location within a predetermined range from the identified cur- rent location, and for controlling whether or not to output, through the speaker, an outside sound, inputted through the microphone, based on whether or not the metadata for the location satisfies an outside sound outputting condition or an outside sound non-outputting condition.

2. The in-vehicle device set forth in claim 1, wherein:

the control device carries out at least one of (X) through (Z), below:

(X) If the metadata for a location within a predetermined range from the current location that has been identified satisfies a predetermined condition for outputting outside sound, and the vehicle is near the location, fade-in of outside sound from the speaker is started;

(Y) If the metadata for a location within a predetermined range from the current location that has been identified satisfies a predetermined condition for non-outputting of outside sound, and the vehicle is near the location, fade-out of outside sound from the speaker is started; and (Z) If the metadata for a location within a predetermined range from the current location that has been identified satisfies the predetermined condition for outputting of outside sound, and the vehicle is far from the location, fade-out of outside sound from the speaker is started.

3. The in-vehicle device set forth in claim 2, wherein:

the front side and rear side of the vehicle are equipped with respective speakers; and the controlling device:

in (X) or (Y), carries out outputting of output sound from the speaker on the front side of the vehicle; and in (Z), carries out outputting of output sound from the speaker on the back side of the vehicle.

4. The in-vehicle device set forth in claim 1, wherein:

For each location, the metadata of the location includes at least one of (A) through (C), below:

(A) Information expressing the topography, an intersection, a road, a facility, and the type and/or state of the surface at the location, and (B) Information expressing an importance of the location, and (C) Information that is related to the location, expressing an evaluation regarding outside sound at that location.

5. The in-vehicle device set forth in claim 4, wherein:

the interface device is connected so as to enable communication with a user terminal that is an information processing terminal of the user within the cabin of the vehicle; and the user terminal has an applicable application that is an application for identifying, for each of one or a plurality of evaluations linked to information that expresses respective locations, information indicating the evaluation and information indicating a location in relation to the evaluation; and the information of (C) is information received, from the user terminal, by the control device through the interface device.

6. The in-vehicle device set forth in claim 1, wherein:

when metadata of a location within a predetermined range from the current location that has been identified satisfies an outside sound outputting condition and a sound outputting mode among a plurality of sound outputting modes that includes a sound outputting mode for sound image localization and a sound outputting mode for sound field reproduction is linked to the metadata, the control device outputs, in the linked sound outputting mode, the outside sound that is inputted through the microphone.

7. The in-vehicle device set forth in claim 1, comprising:

a display device that is a display device and/or a warning light, wherein:

when the control device is in a state wherein outside sound inputted through the microphone is not outputted through the speaker and the outside sound satisfies a predetermined condition, the control device outputs a warning through the display device and/or the warning light.

8. A control method that is carried out in an in-vehicle device wherein a microphone for inputting sound from outside of the vehicle is connected so as to enable communication with a speaker for outputting sound into the cabin of the vehicle, including:

identifying a location within a predetermined range from the current location of the vehicle, based on a GPS (Global Positioning System) signal from location control information that is information that includes, for one or each of a plurality of locations, information expressing the location and metadata for the location; and controlling whether or not to output, through the speaker, the outside sound that is inputted through the microphone, based on whether or not the location metadata satisfies an outside sound outputting or outside sound non-outputting condition.

\* \* \* \* \*